(12) United States Patent
Wikander et al.

(10) Patent No.: US 8,085,535 B2
(45) Date of Patent: Dec. 27, 2011

(54) FAN CASING INTEGRATED HEAT SPREADER FOR ACTIVE COOLING OF COMPUTING SYSTEM SKINS

(75) Inventors: Jered H. Wikander, Portland, OR (US); Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 12/641,813

(22) Filed: Dec. 18, 2009

(65) Prior Publication Data

US 2011/0149504 A1 Jun. 23, 2011

(51) Int. Cl.
*H05K 7/20* (2006.01)

(52) U.S. Cl. ........ 361/695; 361/694; 361/700; 361/696; 361/701

(58) Field of Classification Search ........... 361/694–695
See application file for complete search history.

(56) References Cited

U.S. PATENT DOCUMENTS

| 5,731,953 | A  | * | 3/1998  | Sakurai ........................ 361/695 |
| 5,810,551 | A  | * | 9/1998  | Yamanaka ................. 414/790.7 |
| 6,141,218 | A  | * | 10/2000 | Miyahara ..................... 361/695 |
| 6,317,319 | B1 | * | 11/2001 | Lewis et al. .................. 361/695 |
| 6,407,921 | B1 | * | 6/2002  | Nakamura et al. ............ 361/700 |
| 6,725,906 | B2 | * | 4/2004  | Lin et al. ...................... 361/695 |
| 6,914,782 | B2 | * | 7/2005  | Ku ................................ 361/700 |
| 7,310,226 | B2 | * | 12/2007 | Chen et al. ................... 361/695 |
| 7,333,340 | B2 | * | 2/2008  | Zhang et al. ................. 361/719 |
| 7,652,885 | B2 | * | 1/2010  | Tomioka ....................... 361/700 |
| 2001/0040789 | A1 | * | 11/2001 | Tanaka et al. ................ 361/687 |
| 2006/0221569 | A1 | * | 10/2006 | Liu ............................... 361/695 |
| 2007/0058346 | A1 | * | 3/2007  | Yeh ............................... 361/697 |
| 2008/0156004 | A1 |   | 7/2008  | MacDonald |

* cited by examiner

*Primary Examiner* — Gregory Thompson
(74) *Attorney, Agent, or Firm* — B. Delano Jordan; Jordan IP Law, PC

(57) ABSTRACT

In one embodiment, a fan casing may have a direct thermal connection with a heat spreader. The fan casing might be used in an active cooling system of a mobile computing device such as a notebook computer to reduce and/or eliminate the occurrence of thermal hot spots on the skin of the device. In one example, the heat spreader extends from the enclosure and is disposed between a heat source and the skin of the device.

18 Claims, 3 Drawing Sheets

FAN CASING INTEGRATED HEAT SPREADER FOR ACTIVE COOLING OF COMPUTING SYSTEM SKINS

BACKGROUND

1. Technical Field

Embodiments of the invention generally relate to active cooling systems. In particular, embodiments are related to cooling the skins of computing systems by integrating heat spreaders with fan casings.

2. Discussion

Excessive skin temperatures in notebook computers can be an area of concern, particularly with shrinking notebook form factors and possibly a growing number of heat generating components. Currently, notebook computers might include thermally conductive skin heat spreaders that are stand-alone pieces and are typically mounted to the inner surface of the chassis across from hot components. Other techniques may use vents at, or upstream of, the hot region on the skin in an attempt to increase or redirect the system airflow across the skin. While these approaches may be effective in certain circumstances, there still remains considerable room for improvement, and skin temperatures may exceed ergonomic limits in many cases.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a computing system having a housing with a notebook computer form factor, a top skin and a bottom skin. The computing system can further include a heat source disposed within the housing. The computing system may also include a fan casing disposed within the housing, and a heat spreader having a direct thermal connection with the fan casing. The heat spreader can extend from the fan casing and be disposed between the heat source and either skin. The computing system may also include a fan disposed within the fan casing.

Embodiments can also include an apparatus including a fan casing and a heat spreader having a direct thermal connection with the fan casing. In one example, the fan casing and the heat spreader are integrated with one another and consist of a continuous piece of thermally conductive material. The fan casing and the heat spreader might also be coupled to one another via a thermally conductive connection.

Embodiments may further provide for a method of fabricating a computing system in which a heat source is mounted within a housing having a mobile computer form factor and skin. A fan may be installed within a fan casing having a direct thermal connection with a heat spreader, wherein the heat spreader may extend from the fan casing. The method can also provide for mounting the fan casing within the housing so that the heat spreader is disposed between the heat source and the skin.

Figure 1A:
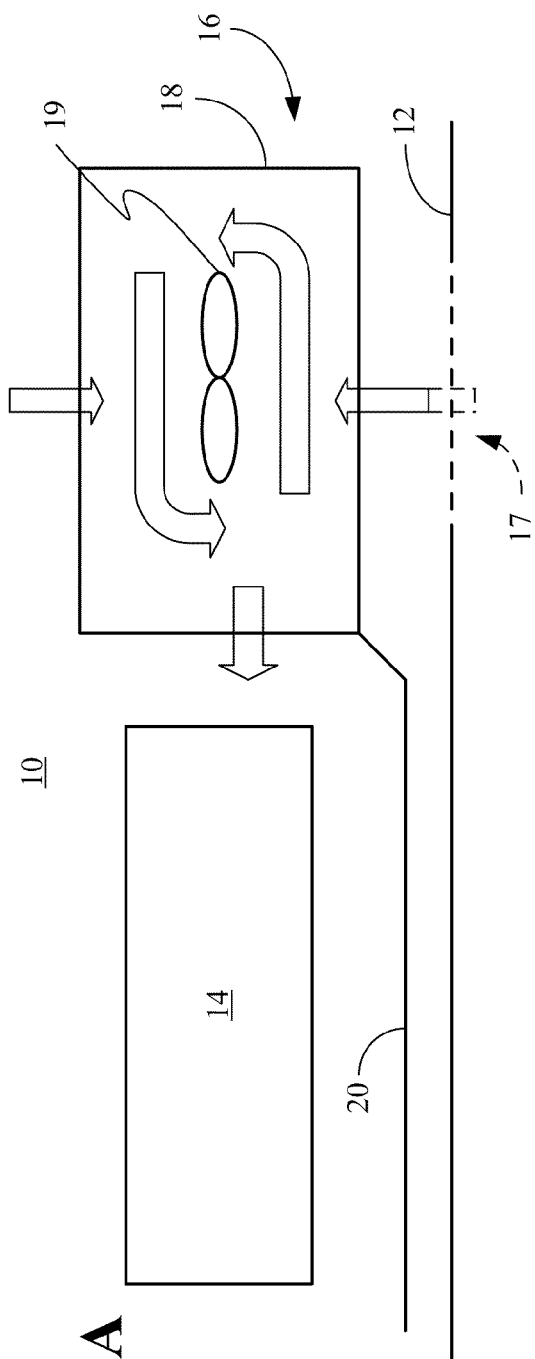
FIGS. 1A and 1B are side views of examples of actively cooled computing systems according to embodiments.

FIG. 1A shows a computing system 10 having a housing skin 12 and a heat source 14 disposed within the housing. The computing system 10 might be a mobile computer such as a notebook or handheld (e.g., personal digital assistant/PDA, wireless smart phone, media player, imaging system, and so on) computing system, and the heat source 14 could be an active component such as a central processing unit (CPU) with one or more processing cores, a memory, or other heat-generating component mounted to a motherboard. The heat source 14 could also be a heat pipe or heat exchanger that is thermally coupled to an active component such as a CPU, etc. The skin 12 might be a bottom or top skin (e.g., in the case of a notebook computer), a back or front skin (e.g., in the case of a handheld device) or any other type of skin that is likely to come into contact with a user of the computing system 10. Indeed, the skin 12 could be integrated into an overall metal chassis of the computing system 10.

In order to prevent the heat source from causing discomfort or injury to the user due to a "hot spot" on the skin 12, the illustrated computing system 10 also includes a structure/apparatus 16 disposed within the housing, wherein the apparatus 16 has a fan casing 18 and a heat spreader 20 integrated with the fan casing 18. The heat spreader 20 may extend from the fan casing 18 to an area between the heat source 14 and the skin 12. In the illustrated example, the heat spreader 20 is distanced from the heat source 14 and the skin 12 to prevent a direct thermal connection with those components. As will be discussed in greater detail, the heat spreader 20 and/or fan casing 18 could alternatively be integrated (or otherwise have a direct thermal connection), with the skin 12. The illustrated heat spreader 20 does have, however, a direct thermal connection (e.g., for thermal conduction) to the fan casing 18. Accordingly, the heat spreader 20 of the fan casing 18 can provide a shielding and spreading effect for heat that would otherwise be incident on the skin 12 from the heat source 14.

Moreover, because the apparatus 16 may also include a fan 19 such as a centrifugal blower (e.g., curved or straight vane) to take in air, circulate it and blow it across the heat source 14, this airflow across the surface of the apparatus 16 can provide convective heat transfer to actively cool the fan casing 18 and the heat spreader 20. The fan 19 may blow across the heat source 14 or in the opposite direction altogether. The use of an ambient air inlet 17 in the skin 12 adjacent to a bottom air inlet of the enclosure 18 may lower the air temperature within the fan casing 18, promote stronger airflow from the bottom of the apparatus 16 and further enhance the convective cooling effect. The illustrated heat spreader 20 and enclosure 18 can be made of a continuous piece of thermally conductive material such as copper, aluminum or graphite.

Figure 1B:
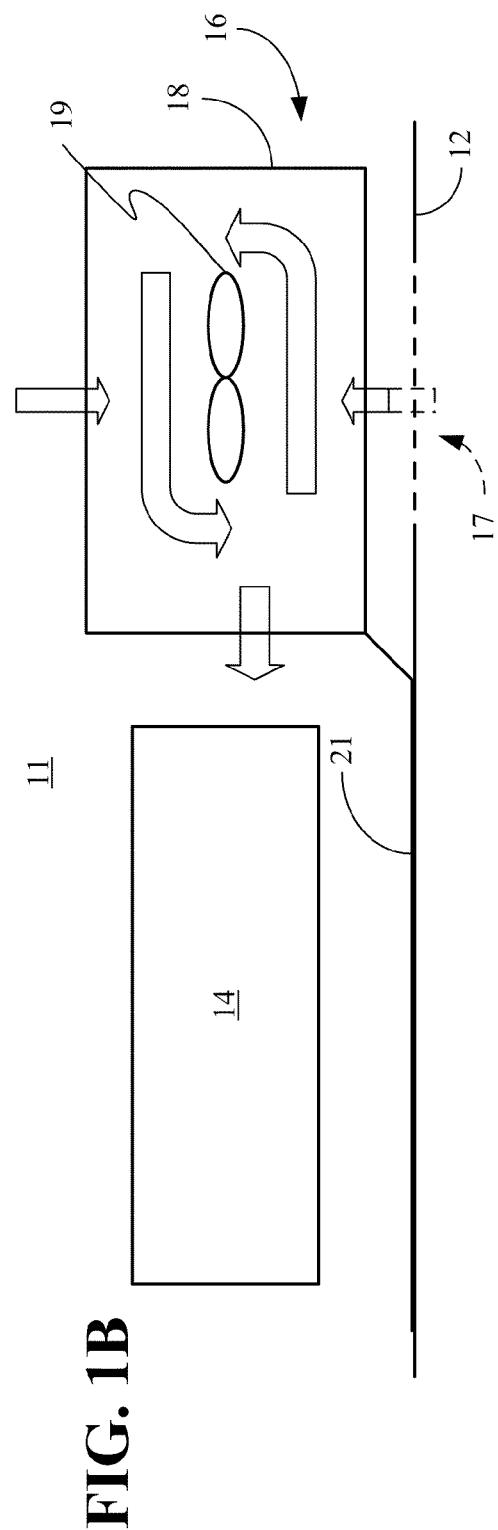

FIG. 1B shows a computing system 11, in which a heat spreader 21 is integrated with the skin 12, which could further be integrated into an overall metal chassis of the computing system 10, as already noted. In the illustrated example, the above-described convective cooling advantages may still be realized, and could be used to enhance the cooling of the overall chassis.

Figure 2A:
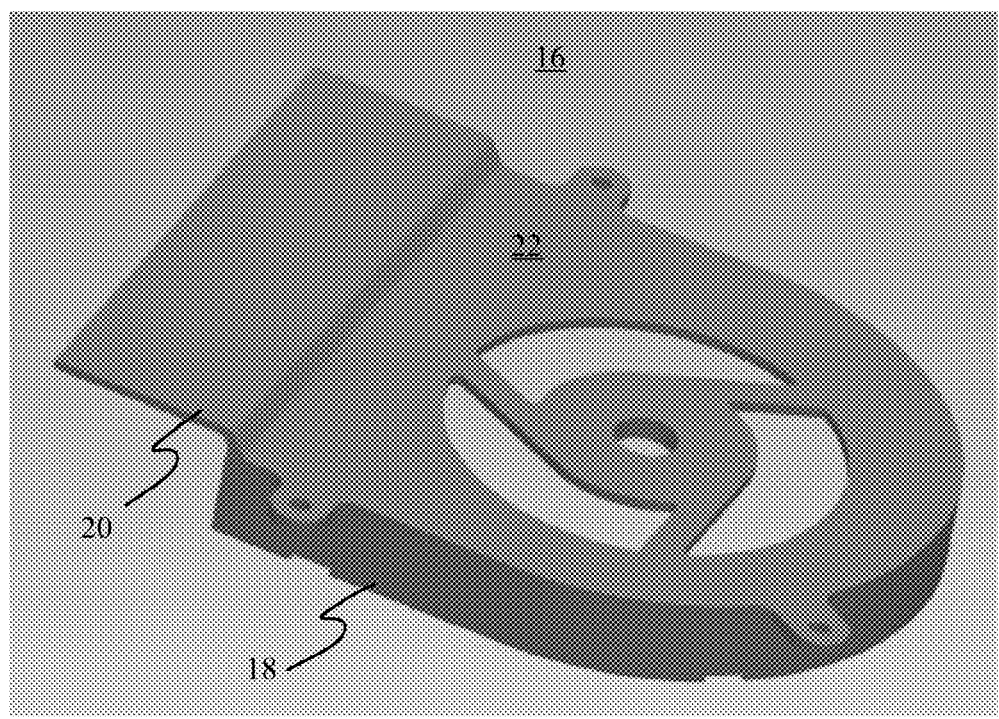
FIGS. 2A and 2B are perspective views of examples of fan casings according to embodiments.

Turning now to FIG. 2A, a perspective view of the apparatus 16 demonstrates that the fan casing 18 can have an inlet face 22 that permits air to enter the fan from the bottom surface of the fan. As already noted, the air inlet face 22 can be disposed adjacent to an ambient air inlet 17 (FIG. 1) to promote even stronger and cooler airflow from the bottom of the apparatus 16. In the illustrated example, the heat spreader 20 extends from a portion of the fan casing 18 as a wing-like protrusion and is substantially parallel to the inlet face 22. Such a configuration can reduce the vertical profile of the apparatus 16 and facilitate smaller form factors for devices such as notebook computers.

Figure 2B:
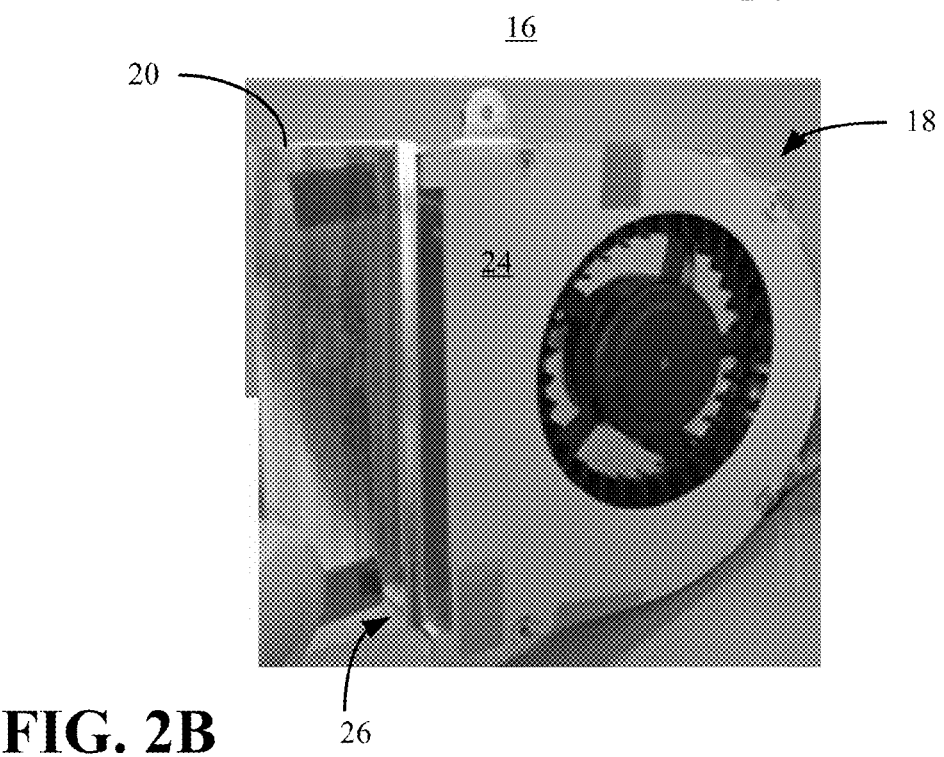

FIG. 2B shows a top perspective view of the apparatus 16 in which another air inlet face 24 permits airflow from the top of the apparatus 16. Thus, the fan casing 18 can have a pair of opposing inlet faces made up of the inlet face 24 and the inlet face 22 (FIG. 2A). The illustrated fan casing 18 also has an outlet face 26 that is substantially perpendicular to the inlet faces 24, 22 (FIG. 2A), and the heat spreader 20. The outlet face 26 can provide a mechanism for directing airflow across a heat source such as heat source 14 (FIG. 1).

Figures 3, 4:
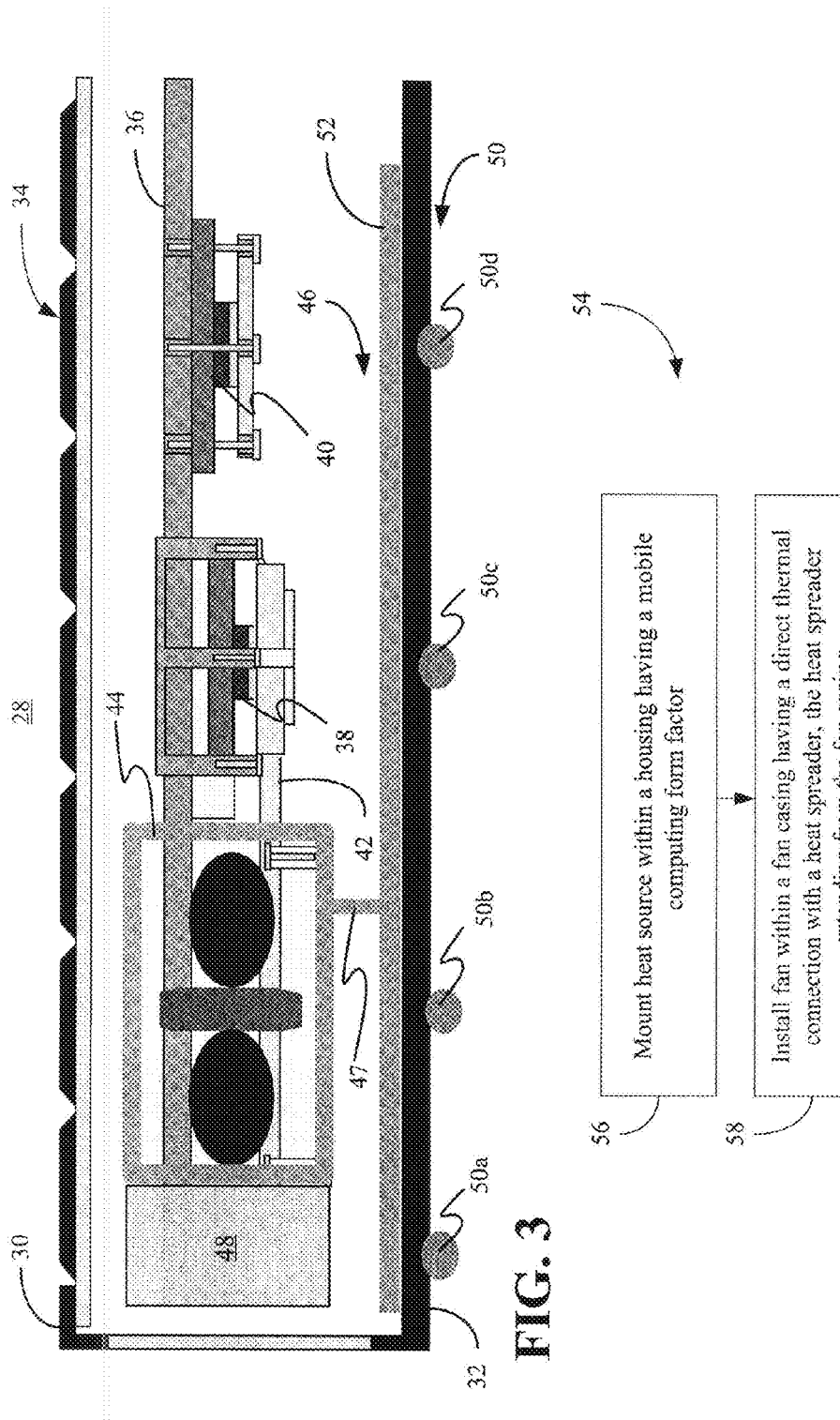
FIG. 3 is a side view of an example of an actively cooled notebook computing system according to an embodiment.
FIG. 4 is a flowchart of an example of a method of fabricating a computing system according to an embodiment.

FIG. 3 demonstrates another example of a computing system 28 having a housing 30 with a notebook form factor and a bottom skin 32. Beneath a keyboard 34 may reside a motherboard 36 with a number of heat generating components such as a CPU 38 and various other components 40. The illustrated CPU 38 is coupled to a heat pipe 42, which extends around a fan casing 44 of a structure 46 and attaches to a heat exchanger 48. Accordingly, potential thermal hot spots 50 (50*a*-50*d*) could occur on the exterior of the bottom skin 32 as a result of the CPU 38, heat pipe 42, heat exchanger 48 and/or other components 40. The illustrated structure 46, however, also has a heat spreader 52 coupled to the fan casing 44 via a thermally conductive connection 47 to reduce the severity of and/or eliminate the hot spots 50. In particular, the heat spreader 52 may extend from the fan casing 44 and be disposed between the bottom skin 32 and the CPU 38, heat pipe 42, heat exchanger 48 and/or other components 40.

Turning now to FIG. 4, a method 54 of fabricating a mobile computing system is shown. The computing system could be a mobile computer such as a notebook computer or handheld device (e.g., PDA, wireless smart phone, media player, imaging system, and so on). Processing block 56 provides for mounting a heat source within a housing having a mobile computer form factor and a bottom skin. A fan may be installed within a fan casing at block 58, wherein the fan casing has a direct thermal connection with a heat spreader, and the heat spreader extends from the fan casing. As already noted, the fan casing and the heat spreader may be integrated with one another and can consist of a continuous piece of thermally conductive material. Alternatively, the fan casing and the heat spreader may be coupled to one another via a thermally conductive connection such as a TIM.

Block 60 provides for mounting the fan casing within the housing so that the heat spreader is disposed between the heat source and a skin of the housing. The mounting process at block 60 may involve distancing the heat spreader from the heat source and the skin, wherein the heat spreader does not have a direct thermal connection with the heat source or the skin. Alternatively, the skin could be integrated with or in direct thermal contact with the heat spreader/fan casing. The fan casing may include an outlet face, and the heat spreader may be substantially perpendicular to the outlet face. In addition, the fan casing may include an inlet face that is substantially perpendicular to the outlet face, and the skin could have an ambient air inlet, wherein the inlet face of the fan casing is disposed adjacent to the ambient air inlet of the skin. The order in which the illustrated processing blocks may be implemented is shown to facilitate discussion only, and may vary depending upon the circumstances.

Thus, a thermal pathway can be provided for at least a portion of the heat that would otherwise be incident on computing system skins. For example, an integration of two thermal components: a skin specific heat spreader and a blower fan casing (e.g., specific to actively cooled mobile computing systems), can provide substantial advantages over conventional solutions. The skin heat spreader may provide a shielding and spreading effect for heat that would otherwise be incident upon the skin from the heat source. Integrating the skin heat spreader into the fan casing may provide a continuous cooling method for the skin heat spreader. In particular, the spreader can have a direct thermal connection (for thermal conduction) to the fan casing but may not have a direct thermal connection to the heat exchanger, heat pipe, CPU or other sources of heat. This can be done to maximize the potential for the fan casing to cool the skins (by minimizing the casing temperature).

A direct fan inlet grille in the mobile device chassis can enable cool ambient air to enter the fan and better assist in cooling the fan casing. The spreader and fan casing can be manufactured as a single continuous piece of thermally conductive material such as copper, aluminum or graphite. The spreader portion may be constructed as a wing-like protrusion off of the casing that could be shaped and oriented inside the mobile device such that it would rest between the hot component and the skin, or against the skin. Air may be pulled across the fan casing as it enters the fan inlets from inside of the system, and from direct fan inlet grilles in the bottom skin of the chassis in the case that there is a direct fan inlet. During operation, air can also move across the fan casing and can circulate around the inside of the fan casing as it travels through the fan. This airflow across the fan casing may provide convective heat transfer to actively cool the fan casing and integrated heat spreader.

Embodiments of the present invention are applicable for use with all types of computing systems and semiconductor integrated circuit ("IC") chips. Examples of these IC chips include but are not limited to processors, controllers, chipset components, programmable logic arrays (PLA), memory chips, network chips, and the like. In addition, in some of the drawings, airflow and/or signal conductor lines may be represented with lines. Some may be thicker, to indicate more constituent signal paths, have a number label, to indicate a number of constituent signal paths, and/or have arrows at one or more ends, to indicate primary information or flow direction. This, however, should not be construed in a limiting manner. Rather, such added detail may be used in connection with one or more exemplary embodiments to facilitate easier understanding of a circuit. Any represented signal or airflow lines, whether or not having additional information, may actually comprise one or more signals that may travel in multiple directions and may be implemented with any suitable type of cooling or signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known mechanical and/or power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
    a housing having a notebook computer form factor, a top skin and a bottom skin;
    a heat source disposed within the housing;
    a fan casing disposed within the housing;
    a heat spreader having a direct thermal connection with the fan casing, the heat spreader extending from the fan casing and disposed between the heat source and the bottom skin; and
    a fan disposed within the fan casing, wherein the heat spreader is distanced from the heat source and the bottom skin, and wherein a substantial portion of a surface of the heat spreader does not have a direct thermal connection with a surface of the heat source or a surface of the bottom skin.

2. The system of claim 1, wherein the fan casing and the heat spreader are integrated with one another and consist of a continuous piece of thermally conductive material.

3. The system of claim 2, wherein the thermally conductive material includes at least one of copper, aluminum and graphite.

4. The system of claim 1, wherein the fan casing and the heat spreader are coupled to one another via a thermally conductive connection.

5. The system of claim 4, wherein the thermally conductive connection includes a thermal interface material.

6. The system of claim 5, wherein the fan casing includes an inlet face and an outlet face that is substantially perpendicular to the inlet face.

7. The system of claim 6, wherein the heat spreader is substantially perpendicular to the outlet face.

8. The system of claim 1, wherein the heat source includes at least one of a heat exchanger, a heat pipe, memory and a central processing unit (CPU).

9. An apparatus comprising:
    a fan casing;
    a heat spreader having a direct thermal connection with the fan casing, the heat spreader extending from the fan casing and disposed between a heat source and a bottom skin of a housing; and
    a fan disposed within the fan casing, wherein the heat spreader is distanced from the heat source and the bottom skin, and wherein a substantial portion of a surface of the heat spreader does not have a direct thermal connection with a surface of the heat source or a surface of the bottom skin.

10. The apparatus of claim 9, wherein the fan casing and the heat spreader are integrated with one another and consist of a continuous piece of thermally conductive material.

11. The apparatus of claim 10, wherein the thermally conductive material includes at least one of copper, aluminum and graphite.

12. The apparatus of claim 9, wherein the fan casing and the heat spreader are coupled to one another via a thermally conductive connection.

13. The apparatus of claim 12, wherein the thermally conductive connection includes a thermal interface material.

14. The apparatus of claim 9, wherein the heat spreader extends from the fan casing.

15. A method comprising:
    mounting a heat source within a housing having a mobile computer form factor and a skin;
    installing a fan within a fan casing having a direct thermal connection with a heat spreader, the heat spreader extending from the fan casing;
    mounting the fan casing within the housing so that the heat spreader is disposed between the heat source and the skin;
    distancing the heat spreader from the heat source; and
    distancing the heat spreader from the skin, wherein a substantial portion of a surface of the heat spreader does not have a direct thermal connection with a surface of the heat source or a surface of the skin.

16. The method of claim 15, wherein the fan casing and the heat spreader are integrated with one another and consist of a continuous piece of thermally conductive material.

17. The method of claim 15, wherein the fan casing and the heat spreader are coupled to one another via a thermally conductive connection.

18. The method of claim 17, wherein the thermally conductive connection includes a thermal interface material.

* * * * *